(12) United States Patent
Shen et al.

(10) Patent No.: US 7,112,095 B2
(45) Date of Patent: Sep. 26, 2006

(54) CARD CONNECTOR

(75) Inventors: Guojian Shen, Kunsan (CN); Ren-Chih Li, Tu-Chen (TW)

(73) Assignee: Hon Hai Precision Ind. Co., LTD, Taipei Hsien (TW)

( * ) Notice: Subject to any disclaimer, the term of this patent is extended or adjusted under 35 U.S.C. 154(b) by 0 days.

(21) Appl. No.: 11/165,722

(22) Filed: Jun. 24, 2005

(65) Prior Publication Data

US 2006/0110958 A1 May 25, 2006

(30) Foreign Application Priority Data

Nov. 25, 2004 (CN) .................. 2004 2 0109595

(51) Int. Cl.
*H01R 24/00* (2006.01)
(52) U.S. Cl. ...................... 439/630; 439/138
(58) Field of Classification Search ............... 439/630, 439/632, 633–635, 160, 377, 136–139
See application file for complete search history.

(56) References Cited

U.S. PATENT DOCUMENTS

| | | | |
|---|---|---|---|
| 6,386,920 B1 | 5/2002 | Sun | |
| 6,669,512 B1 * | 12/2003 | Lee | 439/630 |
| 6,726,508 B1 * | 4/2004 | Watanabe et al. | 439/677 |
| 6,764,323 B1 * | 7/2004 | Shimada et al. | 439/138 |
| 6,913,492 B1 * | 7/2005 | Kuroda et al. | 439/631 |
| 2003/0081388 A1 * | 5/2003 | Yang | 361/737 |
| 2003/0119365 A1 * | 6/2003 | Watanabe et al. | 439/630 |
| 2004/0110423 A1 * | 6/2004 | Shishikura et al. | 439/630 |
| 2005/0164559 A1 * | 7/2005 | Shimizu et al. | 439/630 |

* cited by examiner

*Primary Examiner*—Ross Gushi
(74) *Attorney, Agent, or Firm*—Wei Te Chung

(57) ABSTRACT

A card connector comprises an insulating housing defining a card receiving space for accommodating two kinds of different cards in size; a plurality of contacts retained in the housing, and comprising a plurality of different contacting portions for electrically connecting with the different cards respectively; and at least a anti-misinsertion appliance disposed in the housing, and comprising a shutter member and an actuator member for controlling the shutter member to open and close so that the different cards are led into the correct contacting areas.

13 Claims, 9 Drawing Sheets

CARD CONNECTOR

BACKGROUND OF THE INVENTION

1. Field of the Invention

The present invention relates to a card connector, especially to a card connector which has anti-misinserting appliances. This application relates to two contemporaneously filed applications each having the same applicants, the same title and the same assignee with the instant application.

2. Description of Related Art

With development of electrical appliances such as portable telephones, digital cameras, PDA (personal digital assistance), portable audio and the like, a lot of different kinds of cards such as a SD (super density, secure digital) card, a CF (compact flash) card, a MMC (multimedia card), a MS (memory stick) card, a MS Duo (memory stick duo) card and an XD (xd-picture) card are widely used in the field of the electronics. Because different cards have different external dimensions, thus different card connectors are needed loading corresponding different cards. However, if one card connector can only load one card, more cards are needed more card connectors to load, thus occupying a lot of areas of the electrical appliances and interfering with downsizing of the electrical appliances. Thus a card connector which can load some different cards simultaneously is accomplished.

U.S. Pat. No. 6,386,920 discloses a card connector which can load some different cards. The connector defines a card receiving space which is divided into some different card cavities for receiving an SM card, a MMC, an SD card and a MS card. That is to say, though the SM card, the MMC, the SD card and the MS card have their own card cavity, these card cavities are in a card receiving space. Especially, the MMC and the SD card have same length and width and height of the SD card is higher than that of the MMC, thus the MMC is easily inserted into the inserting cavity of the SD card because of misinsertion, then damaging the card connector.

Hence, an improved card connector is required to overcome the disadvantages of the prior art.

SUMMARY OF THE INVENTION

An object of the present invention is to provide a card connector which can prevent misinsertion of cards.

Accordingly, to achieve above-mentioned object, A card connector comprises an insulating housing defining a card receiving space and the card receiving space defining a first card cavity and a second card cavity along a vertical direction for accommodating two kinds of different cards in size; a plurality of contacts retained in the housing, and comprising a first and second contacting portions exposed in the card receiving space for electrically connecting with the different cards respectively; at least an anti-misinsertion appliance disposed in the housing, and comprising a shutter member and an actuator member for controlling the shutter member to open and close and a connecting member connecting the actuator member and the shutter member; and when the actuator member is moved out from the card receiving space because of an outer force, the shutter member can open the card receiving space completely for receiving the corresponding card. Moreover, each of the contacts is provided with a first and second contacting portion spaced each other along a card insertion direction and exposed in the card receiving space and a soldering portion extending out of the housing.

The detailed features of the present invention will be apparent in the detailed description with appropriate reference to the accompanying drawings.

DETAILED DESCRIPTION OF THE INVENTION

Figure 1:
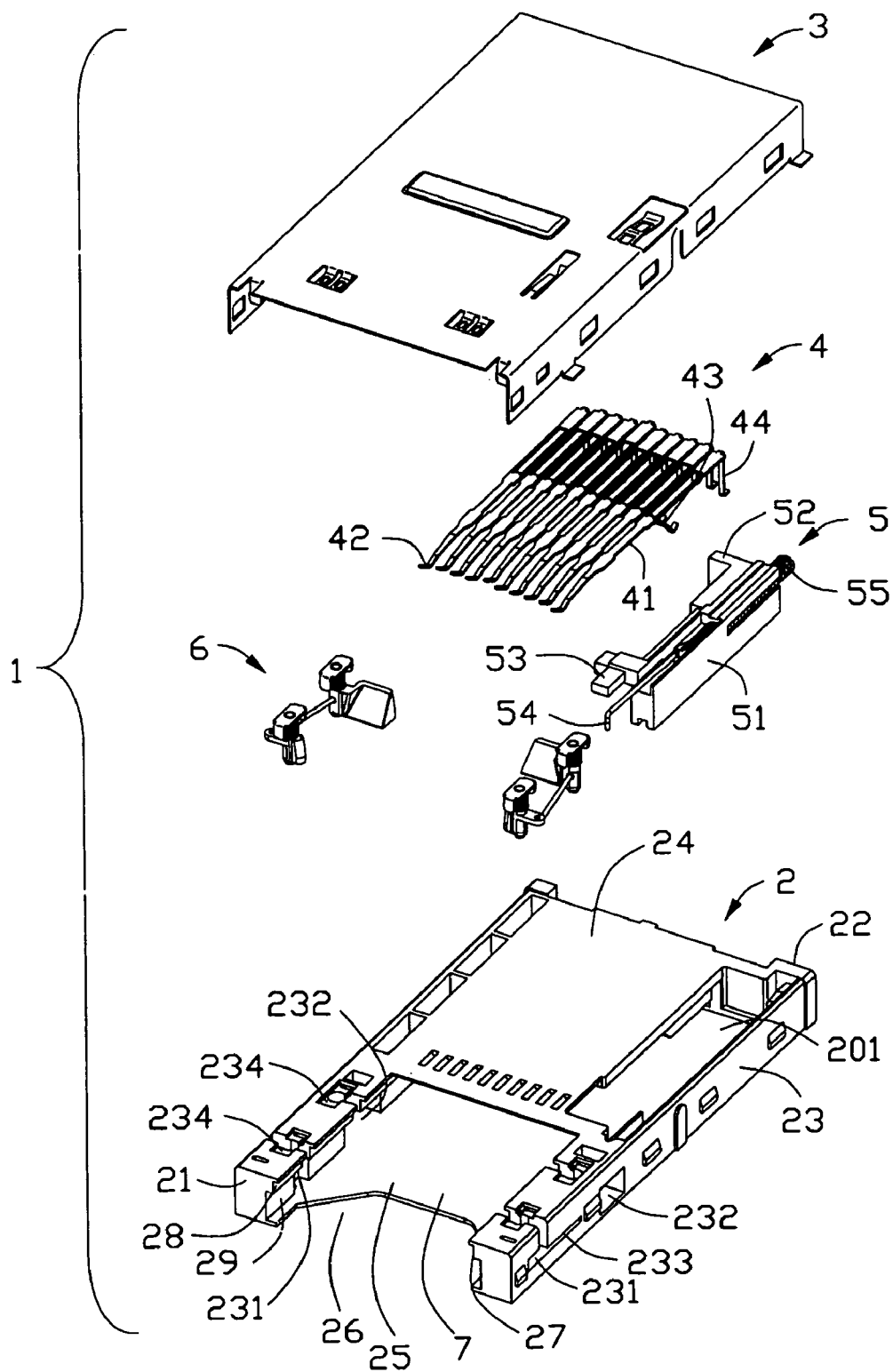
FIG. 1 is an exploded perspective view of the card connector in accordance with the present invention.

As shown in FIGS. 1 to 10, the card connector 1 of the present invention can be used commonly for a thin, short, small card such as a MS Duo card and a thick, long, large card such as a MS card. The present invention, however, is not limited to the use of these cards but also be applied satisfactorily to other memory cards such as SD cards and IC cards.

The card connector 1 of the present invention comprises an insulating housing 2, a shielding member 3, a plurality of electrical contacts 4, an ejector 5 and an anti-misinsertion appliance 6.

The housing 2 is approximately box-shaped and the shielding member 3 is used in combination with the housing 2. The housing 2 defines a card receiving space (not labeled) among an end wall 22, a pair of side walls 23, a top wall 24 and a bottom wall 25 thereof. The top wall 24 is approximately formed on rear part of the housing 2. The housing 2 is opened at a front face 21 thereof to form a card insertion opening 7 and defines a card insertion direction along a front-end direction. The housing 2 is formed with a step portion 27 therein to divide the card receiving space into a small card cavity 28 served as a first card cavity and a large card cavity 29 served as a second card cavity which are aligned along a vertical direction perpendicular to the card insertion direction. An echelon slot 26 is formed on the bottom wall 25 adjacent to the card insertion opening 7.

On both side walls 23 of the housing 2 adjacent to the card insertion opening 7, the anti-mininserion appliance 6 is arranged to face each other with the card insertion opening 7 interposed therebetween. The anti-misinsertion appliance 6 comprises an actuator member 61, a connecting member 65 and a shutter member 62 together performed a switching operation according to a difference in size, such as thickness, width or length, between a small card and a large card.

Referring to FIG. 1, the contacts 4 are assembled into the housing 2 from the end wall 22 thereof. Each of the electrical contacts 4 comprises a horizontal portion 41, a first contacting portion 42 extending toward the card insertion opening 7 from one end of the horizontal portion 41, a soldering portion 44 extending perpendicularly beyond the end wall 22 of the housing 2 from another end of the horizontal portion 41 and a second contacting portion 43 punched from the horizontal portion 41. The second contacting portion 43 is located between the first contacting portion 42 and the soldering portion 44 and extends slantways toward the bottom wall 25 from the horizontal portion 41. The first contacting portions 42 are exposed in the small card cavity 28 and together define a first contacting area and the second contacting portions 43 are exposed in the large card cavity 29 and together define a second contacting area. The first contacting portion 42 and the second contacting portion 43 are electrically connected with the small card such as the MS Duo card and the large card such as the MS card respectively.

The ejector 5 is secured at a rear corner 201 of the housing 2 adjacent to one side wall 23. A column (not labeled) is formed on the end wall 22 and protrudes into the slot 201. The ejector 5 comprises a base body 51 and the ejector 5 is secured in the housing 2 in virtue of one end of a spring 55 set on the column (not labeled) of the housing 2 and opposite end thereof disposed in the ejector 5, and one end of a pin 54 locked on the base portion 51 and another end thereof locked on the side wall 23. A protruding portion 52 and a T-shaped protruding portion 53 are formed on the base body 51 along the front-rear direction. The protruding portion 52 is formed on end of base portion 51 adjacent to the end wall 22 and protrudes into the card receiving space. The stopper 53 is disposed on opposite end of the base portion 51 and protruding into the small card cavity 28.

Figure 2:
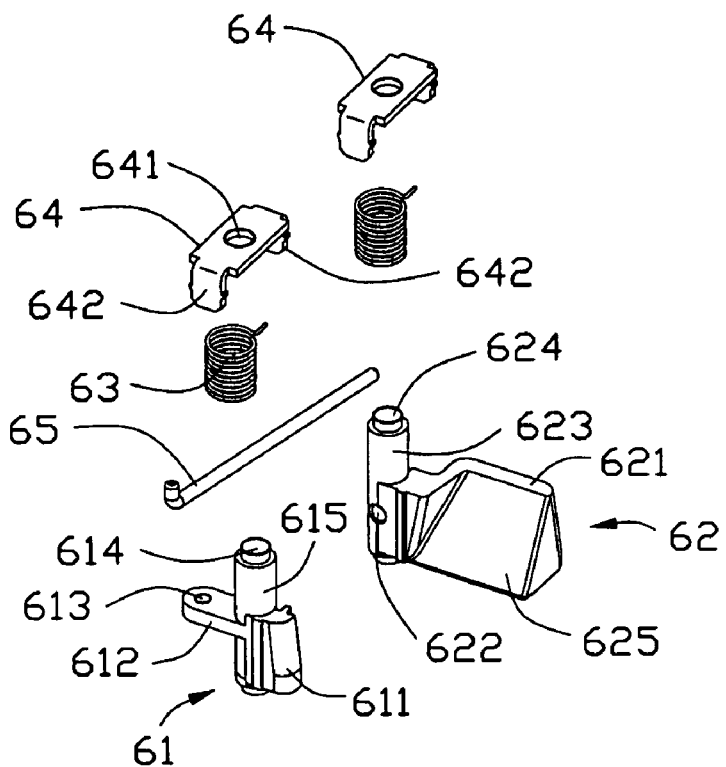
FIG. 2 is an exploded perspective view of an anti-misinserting appliance of the card connector shown in FIG. 1.
Figure 3:
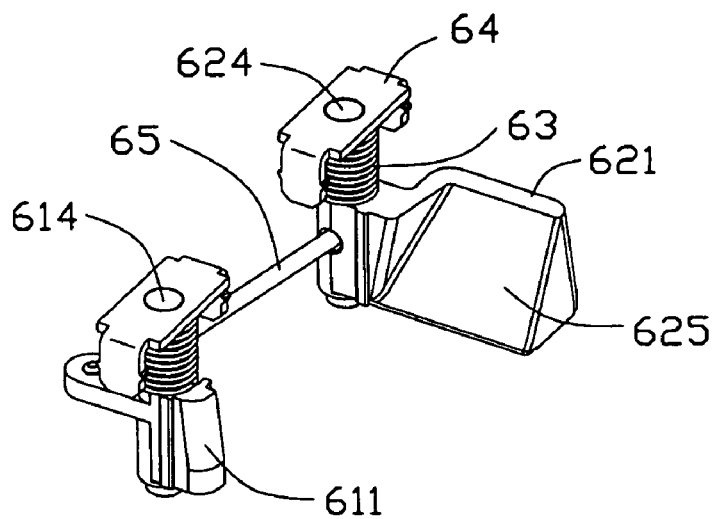
FIG. 3 is an assembled perspective view of the anti-misinserting appliance of the card connector shown in FIG. 2.

Referring to FIGS. 1 and 2, The actuator member 61, the shutter member 62 and the connecting member 65 are received in a first apertures 231, a second apertures 232 and passages 223 defined on the side walls 23 of the housing 2, respectively. The actuator member 61 of the anti-misinsertion appliance 6 has a protruding piece 612 away from the card receiving space, a protruding portion 611 protruding into the large card cavity 29 defined as an original position and a pivoting axis 614 formed on top thereof. A locking hole 613 is formed on end of the protruding piece 612. The shutter member 62 comprises a stopper 621 protruding into the large card cavity 29 defined as an original position, a receiving hole 622 and a pivoting axis 624 formed on top thereof. One end of the connecting member 65 is freely inserted into the receiving hole 622 and another end thereof is locked securely in the locking hole 613. When the large card in inserted, it will press the protruding portions 611 to pivot outward from the card receiving space, then draw the connecting members 65 out of the receiving holes 622 to release the shutter member 62. Each of the anti-misinsertion appliances 6 has a pair of springs 63 and a pair of locking members 64. The locking members 64 are provided with pivoting holes 641 and securing portions 642 extending downward from lateral sides thereof. The pivoting holes 641 are connected with the pivotal axes 614 and 624 respectively. The springs 63 are set on upper parts 615 and 623 of the moveable portions 61 and 62 respectively and one end of the springs 63 are secured on the locking members 64 and another end are secured on the moveable portions 61 and 62 respectively.

The locking members 64 are secured in rectangular slots 234 defined on top of the first apertures 231 and the second apertures 232 in virtue of securing portions 642. The protruding portions 611 and the stoppers 621 are arranged in turn along the card inserting direction and distance between the pair of protruding portions 611 is longer than that of the stoppers 621, that is to say, distance of the stoppers 621 protruding into the large card cavity is longer than that of the protruding portions 611.

Figure 4:
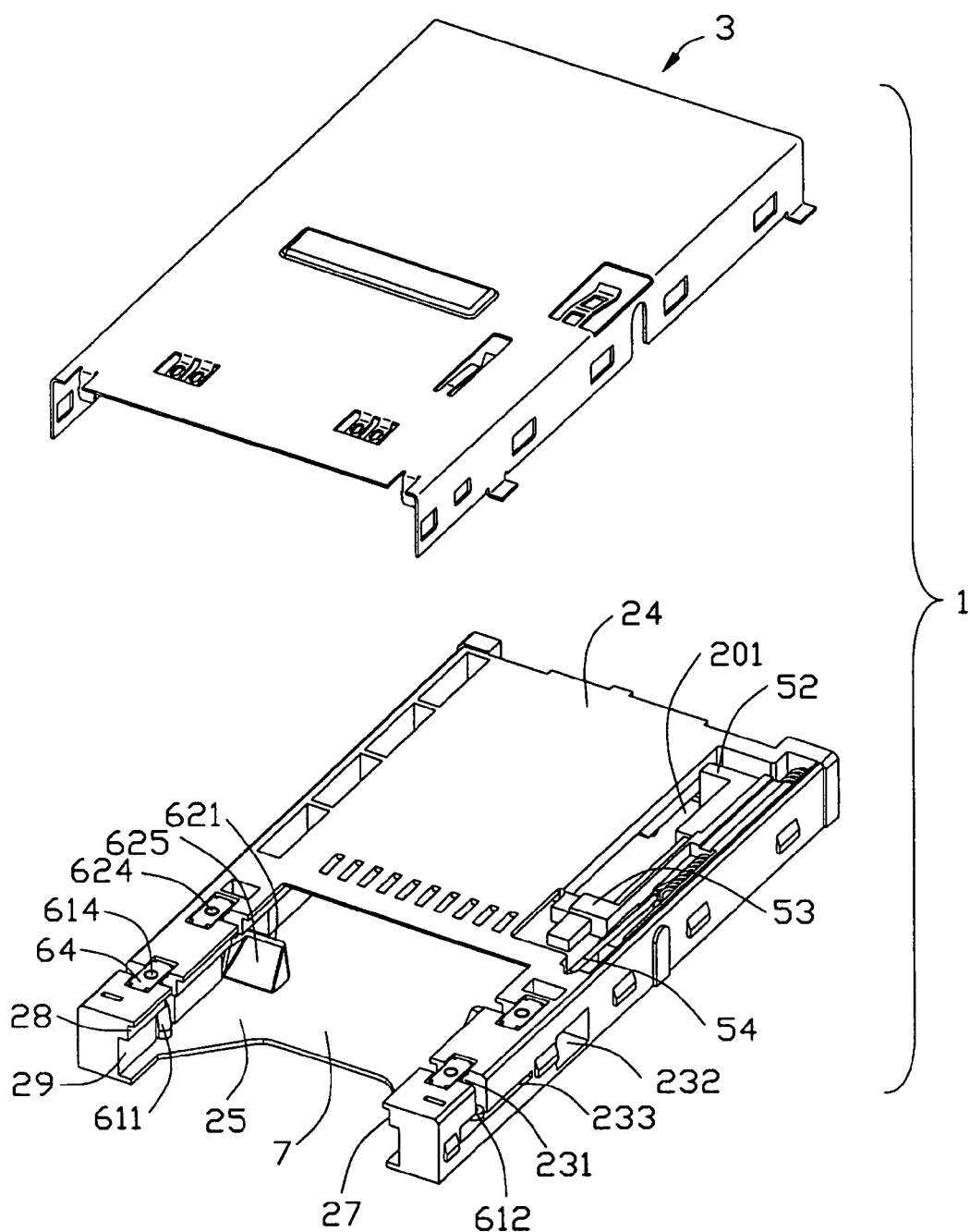
FIG. 4 is a part assembled perspective view of the card connector shown in FIG. 1.
Figure 5:
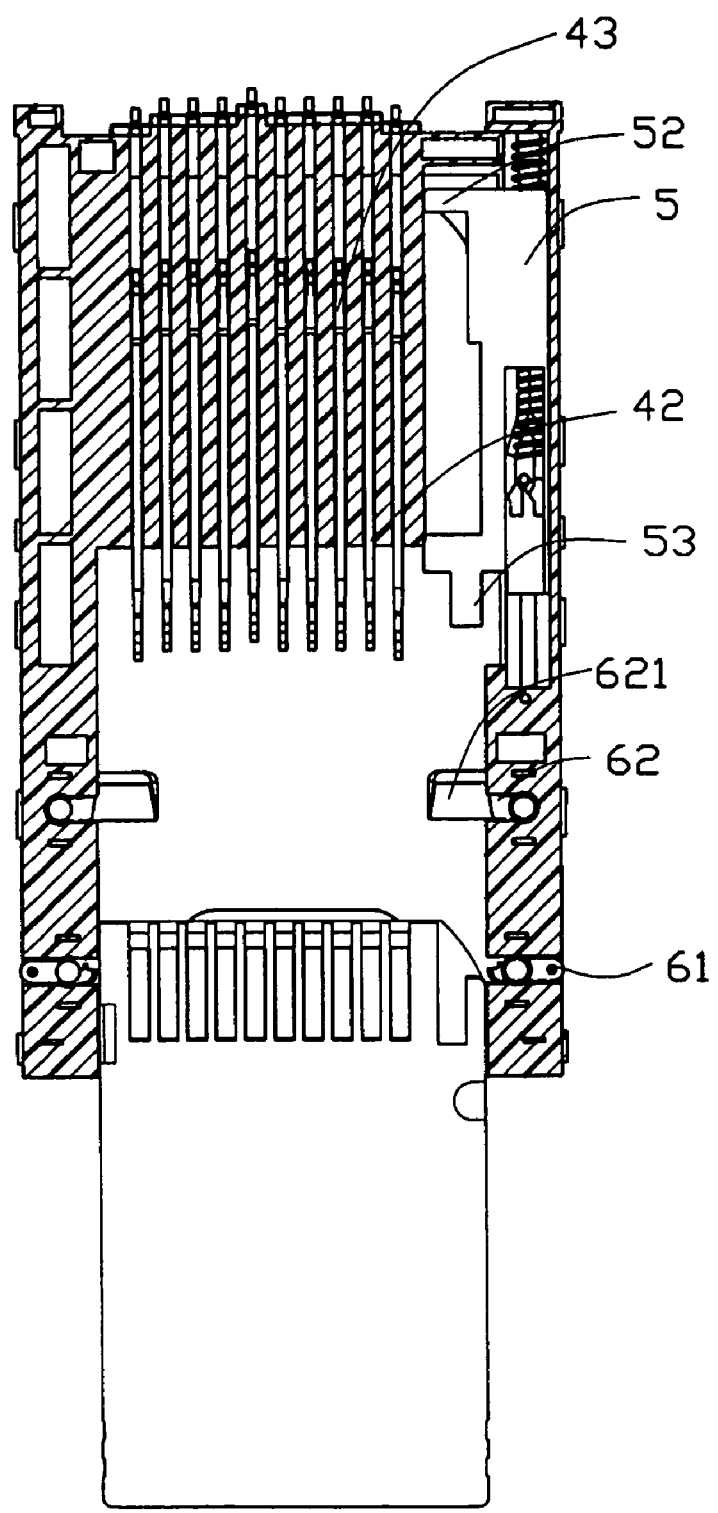
FIG. 5 is a cross-sectional view of the card connector shown in FIG. 1, showing original status of insertion of a small card.
Figure 6:
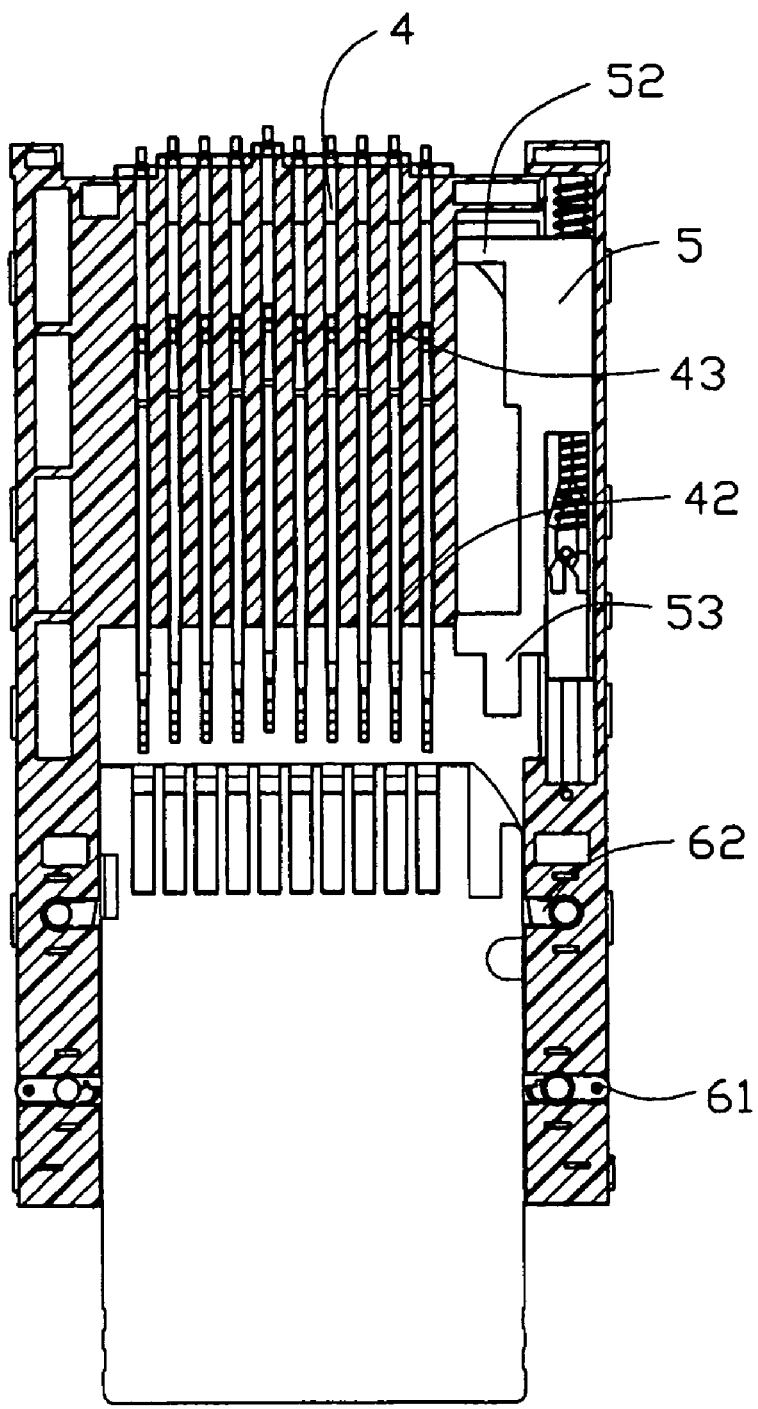
FIG. 6 is a cross-sectional view of the card connector shown in FIG. 1, showing status after the small card collides with a stopper.
Figure 7:
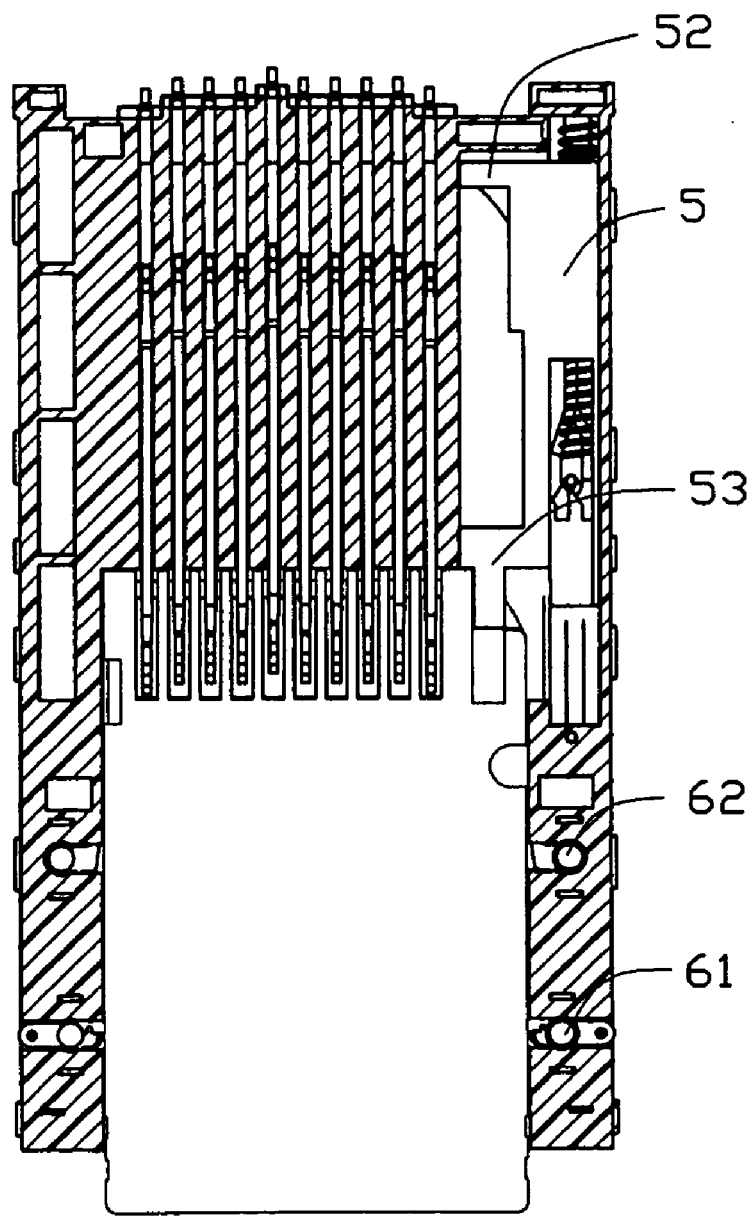
FIG. 7 is a cross-sectional view of the card connector shown in FIG. 1, showing final status of insertion of the small card.
Figure 8:
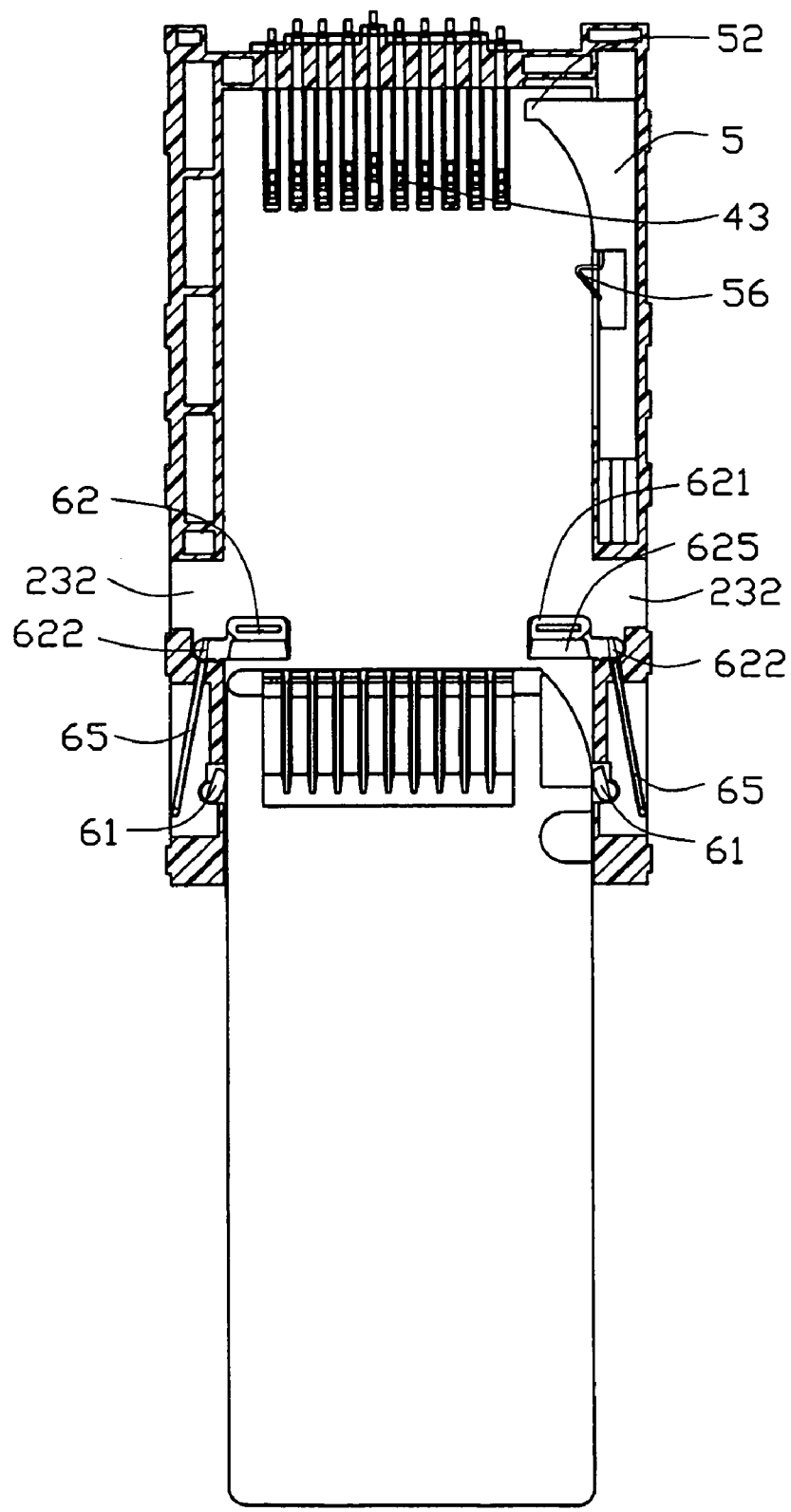
FIG. 8 is a cross-sectional view of the card connector shown in FIG. 1, showing status after a large card collides with a protruding portion.
Figure 9:
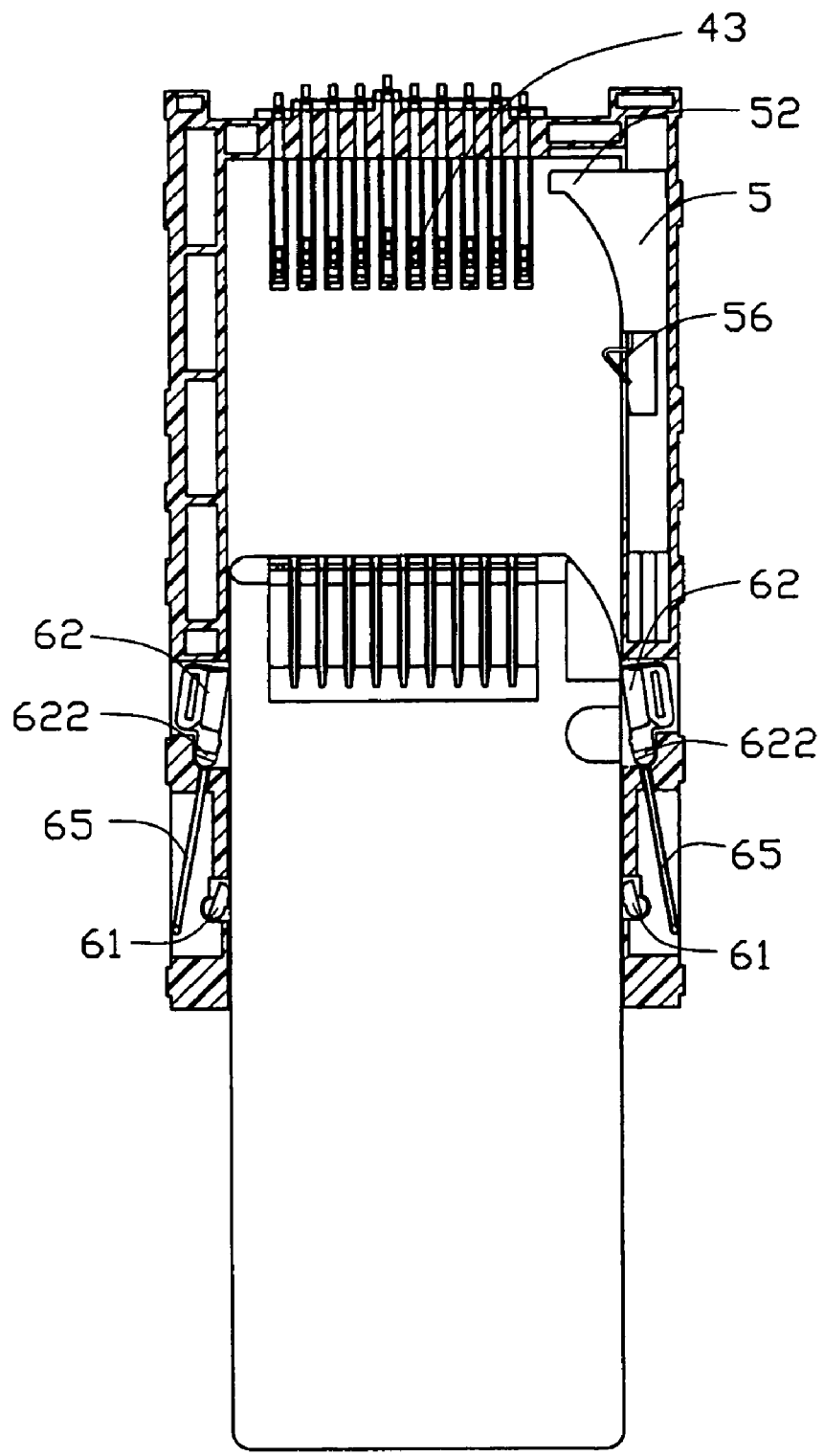
FIG. 9 is a cross-sectional view of the card connector shown in FIG. 1, showing status after the large card collides with the stopper.
Figure 10:
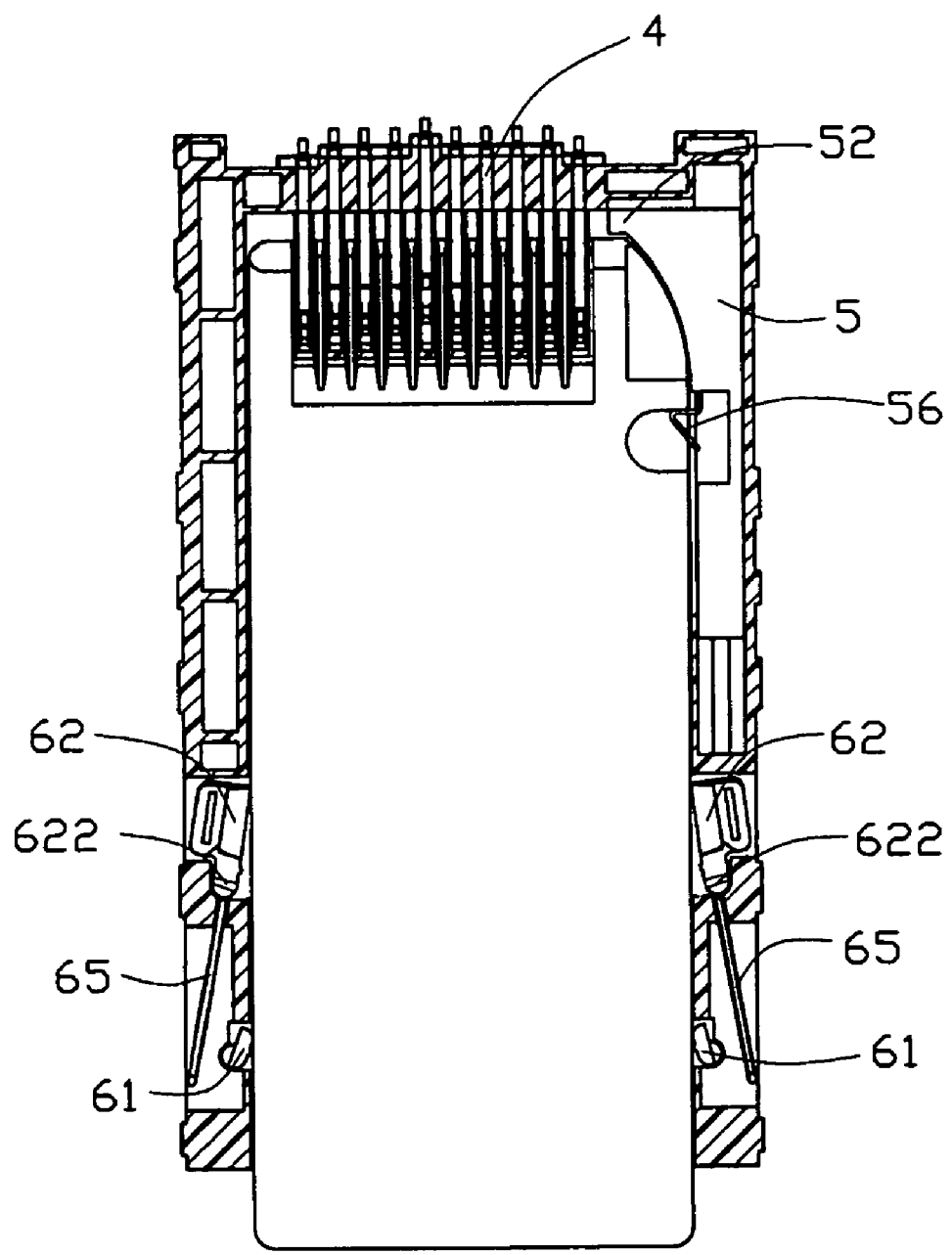
FIG. 10 is a cross-sectional view of the card connector shown in FIG. 1, showing final status of insertion of the large card.

Referring to FIGS. 4, 5 and 6, the small card such as MS Duo card has a width shorter than a normal distance between the pair of protruding portions 611 and the pair of stoppers 621 protruded into the large card cavity 29, so, when the small card is inserted along the small card cavity 28 from the card insertion opening 7, it can be inserted smoothly without any interference. Finally, the T-shaped protruding portion 53 of the ejector 5 engages with a corresponding concave (not labeled) of the small card and the small card electrically connects with the first contacting portion 42 of the contacts 4.

When the small card is inserted along the large card cavity 29 by mistake. Because the width of the small card is shorter than the normal distance between the pair of protruding portions 611, so, when the small card is inserted firstly, it does not contact the protruding portions 611. The small card advances further inward until it contacts the stopper 621. The small card has a width larger than distance between the pair of stoppers 621, so, it contacts the stoppers 621 certainly. Because the small card does not contact the protruding portions 611, the protruding portions 611 do not pivot to open outwardly from the large card cavity 29 and do not draw the connecting members 65 out of the receiving holes 622 of the shutter members 62. So, the stoppers 621 do not pivot outwardly but still protrude into the large card cavity 29 to prevent the small card from advancing inwardly along the large card cavity 29. Thus, the small card then moves into the small card cavity 28 along a pair of guiding faces 625 formed on the pair of the stoppers 621 and connects with the first contacting portion 42 of the contacts 4 finally, and the small card is drawn out in virtue of the ejector 5.

Referring to FIGS. 7, 8 and 9, 10, the large card such as MS card has a width larger than the normal distance between the pair of protruding portions 611, so, when the large card is inserted into the card connector 1 from the card insertion opening 7, it engages and pushes the protruding portions 611, causing the protruding portions 611 to pivot to open outwardly from the large card cavity 29. Because the one end of the connecting members 65 are freely inserted into the receiving holes 622 of the shutter members 62 and another end thereof are locked securely in the locking holes 613 of the actuator members 61, so, when the protruding portions 611 pivot outwardly, it drives the connecting members 65 and draw them out of the receiving holes 622 to release the shutter members 62. The large card advances further inward until it contacts the stoppers 621. The large card has a width larger than a normal distance between the pair of stoppers 621 and the connecting members 65 are already drawn out of the shutter member 62, thus, the stoppers 621 pivot to open outwardly from the large card cavity 29 and do not prevent the large card from advancing along the large card cavity 29 when the large card contacts the stoppers 621. Finally, the large card engages with the protruding portion 52 of the ejector 5 and a concave (no labeled) of the large card contacts a resilient piece 56 (shown in FIG. 10) formed on the ejector 5 to position the large card. The large card electrically connects with the second contacting portions 43 of the contacts 4.

After the large card is withdrawn, the protruding portions 611 of the actuator members 61 and the stoppers 621 of the shutter members 62 of the anti-misinsertion appliances 6 return to protrude into the card insertion space in virtue of elasticity of the springs 63 disposed on the anti-misinsertion appliances 6 for next insertion. Because the small card insertion cavity and the large card insertion cavity are overlapped each other, one card such as MS card or MS Duo card is inserted one time.

While a preferred embodiment in accordance with the present invention has been shown and described, equivalent modifications and changes known to persons skilled in the art according to the spirit of the present invention are considered within the scope of the present invention as described in the appended claims.

What is claimed is:

1. A card connector, comprising:
an insulating housing defining a card receiving space which defines a first card cavity and a second card cavity along a vertical direction for accommodating two kinds of different cards in size, respectively;
a plurality of contacts retained in the housing, and exposed in the card receiving space for electrically connecting with the corresponding different cards respectively, and
an anti-misinsertion appliance disposed in the housing, and comprising a shutter member and an actuator member for controlling the shutter member to open and close and a connecting member connecting the actuator member detachably and the shutter member, the shutter member and an actuator member being protruding into the second card cavity.

2. The card connector as described in claim 1, wherein one end of the connecting member is locked securely in the actuator member and the connecting member can move with movement of the actuator member.

3. The card connector as described in claim 2, wherein another end of the connecting member is freely securely on the shutter member, and when the connecting member moves with movement of the actuator member, the connecting member release the shutter member.

4. The card connector as described in claim 1, wherein the anti-misinsertion appliance comprises springs disposed on the actuator member and the shutter member respectively to make the actuator member and the shutter member return to an original position.

5. The card connector as described in claim 1, wherein the actuator member and the shutter member are pivoted about a pivotal axis thereof respectively.

6. The card connector as described in claim 5, wherein the anti-misinsertion appliance comprises locking members secured the actuator member and the shutter member on the housing.

7. The card connector as described in claim 1, wherein each of the contacts is provided with a first and a second contacting portion spaced each other along a card insertion direction and exposed in the corresponding card cavity and a soldering portion extending out of the housing.

8. The card connector as described in claim 1, wherein the shutter member is rotatable about a first axis, and the actuator is rotatable about a second axis parallel to said first axis.

9. The card connector as described in claim 8, wherein both said first axis and said second axis extend along said vertical direction.

10. A card connector, comprising:
an insulating housing defining a card receiving space for accommodating two kinds of different cards in size;
a plurality of contacts retained in the housing, each contact provided with a first and a second contacting portion exposed in the card receiving space and a soldering portion extending out of the housing, the first contacting portions together defining a first contacting area and the second contacting portions together defining a second contacting area, accordingly, the two contacting area spaced along a card insertion direction for electrically connecting with the different cards; and
an anti-misinsertion appliance disposed in the housing, and comprising a shutter member and an actuator member for controlling the shutter member to open and close so that the different cards are led into the correct contacting areas.

11. The card connector as described in claim 10, wherein the anti-misinsertion appliance comprises a connecting member connected with the actuator member and the shutter member.

12. The card connector as described in claim 10, wherein the shutter member and the actuator member comprise a stopper and a protruding portion both protruding into the card space, respectively.

13. A card connector, comprising:
an insulating housing defining a card receiving space which defines a first card cavity and a second card cavity for accommodating two kinds of different cards in size, respectively;
a plurality of contacts retained in the housing, and exposed in the card receiving space for electrically connecting with the corresponding different cards respectively; and
an anti-misinsertion appliance disposed in the housing, and comprising a shutter member, which protrudes into the second card cavity and communicates with the first card cavity, and an actuator member, which is used to block or unblock the shutter member, for controlling the shutter member to open and close; wherein
both said shutter member and said actuator member are rotatable about corresponding axes extending along a vertical direction which are perpendicular to an insertion direction of the corresponding card.

* * * * *